United States Patent [19]
McBee

[11] 3,738,695
[45] June 12, 1973

[54] REMOVABLE SIDE CAR BUMPER

[76] Inventor: Robert B. McBee, c/o Briones Co., Inc. 5760 Broadway, Roslyn Heights, N.Y. 10463

[22] Filed: Oct. 19, 1971

[21] Appl. No.: 190,596

[52] U.S. Cl. .................... 293/1, 49/462, 114/219, 161/39, 293/62, 296/146
[51] Int. Cl..... B60j 11/00, B60r 19/08, B60r 27/00
[58] Field of Search .................. 49/462; 114/219; 161/39; 293/1, 62; 296/146

[56] References Cited
UNITED STATES PATENTS

| 2,062,919 | 12/1936 | Maas | 114/219 |
| 3,610,669 | 10/1971 | Morrissey, Sr. | 293/62 |
| 1,877,793 | 9/1932 | Beynon | 114/219 |
| 2,117,121 | 5/1938 | Urquhart et al. | 114/219 |
| 2,179,125 | 11/1939 | Kirlin | 114/219 |
| 2,889,165 | 6/1959 | Zientara | 293/1 |
| 2,897,001 | 7/1959 | Adell | 49/462 |
| 2,929,656 | 3/1960 | Adell | 49/462 |
| 2,986,419 | 5/1961 | Barenyi | 293/62 |
| 3,147,176 | 9/1964 | Haslam | 161/39 |
| 3,183,875 | 5/1965 | Russell | 114/219 |
| 3,211,123 | 10/1965 | Foss | 114/219 |
| 3,359,030 | 12/1967 | Newman | 293/1 |
| 3,582,134 | 6/1971 | Shaff | 296/146 |
| 3,596,962 | 8/1971 | Hertzel | 293/1 |
| 3,659,887 | 5/1972 | Marquette | 293/1 |

Primary Examiner—Gerald M. Forlenza
Assistant Examiner—Howard Beltran
Attorney—Steven J. Baron

[57] ABSTRACT

A vehicle impact protection device including an outer tube having a predetermined internal diameter and at least one inner tube having an external diameter of less than that of the outer tube. The inner tube or tubes are operative to be moved into and out from their respective outer tubes thereby forming telescopic means. There are at least two suspension means each being attached by an end thereof to the outer tube while an opposite free end thereof serves to secure the entire device to the vehicle.

7 Claims, 3 Drawing Figures

PATENTED JUN 12 1973 3,738,695

REMOVABLE SIDE CAR BUMPER

BACKGROUND OF THE INVENTION

In recent years many motor vehicle manufacturers, especially those manufacturing automobiles, have discontinued using protective metal strips or the like on the doors and side panels of the vehicles. The absence of these protective strips has generally led to damage to the body area which is unprotected, such as by scraping of the paint and/or chipping thereof, as well as definite dents in the metal covered thereby; the foregoing is usually the result of impact from the door of an adjacent vehicle. Moreover, this problem has been compounded in recent years by the advent of large parking lots where many cars are either parked for a period of time or merely driven to the entrance thereof and subsequently parked by an attendant, who unfortunately may not exercise the same degree of care with respect to another's property as he would with respect to his own, thereby resulting in damage to the exterior of the vehicle.

These parking lots have furthermore magnified and increased the amount of damage and abuse that the side of an automobile receives due to their efforts to squeeze as many cars as possible into a limited area. This creates an uncomfortable situation when one must enter or exit from his car which is parked between two other cars or adjacent another car. In attempting to open his door, the operator, of necessity, causes contact to occur between his door into the side of the adjacent car thus causing the aforesaid impact damage, i.e., scraping and the like.

Heretofore, persons have attempted to alleviate or obviate this problem by either not parking closely adjacent another vehicle, not using parking areas which accommodate too many cars for their limited space, resigning themselves to the damage which will occur to their car or by the use of crude and cumbersome devices which are home-made and which they affix to the exterior of the car. Such devices may be in the form of blocks of wood which are hung from the door, door handle, window or like position of the car and hopefully suffice to prevent injury to the side of the car. It is also known to use a metal strip having a rubber insert therein which strip is permanently affixed to the car body such as by adhesive means or magnetic means (see U.S. Pat. No. 3,582,134). It is also known to use some type of "bumper" guard which is operative to slide back and forth across a rail semi-permanently affixed to the side of the car body (see U.S. Pat. No. 3,596,962). These devices, however, have their obvious inherent drawbacks, most notably, semi-permanency, bulkiness and/or adaptation of the vehicle to accommodate them.

SUMMARY OF THE INVENTION

It is one object of the instant invention to avoid one or more drawbacks of the prior art.

It is another object of the present invention to provide for a car body guard which is relatively inexpensive, easy to use, portable, is not permanently affixed to the vehicle body, nor need the vehicle be modified to accommodate same.

Further objects and advantages of the instant invention will be apparent as the description proceeds.

The instant invention includes the provisions of an impact protection device operable to be hung on the exterior of a car. Broadly speaking, it includes in combination, at least one outer tube having a predetermined internal diameter, at least one inner tube having an external diameter of less than said outer tube; said inner tube being operative to be moved into and out from said outer tube in mating fashion, thereby forming telescopic means. There is also included at least two suspension means being operative to engage at least one of said tubes and securing means disposed on each of said suspension means and being operative to engage a portion of said vehicle whereafter said impact protection device will be in a hanging position. The suspension means each engage themselves by a free end thereof upon the vehicle in such a way that the device is operable to protect the automobile when the telescopic means are in the extended position and same is properly hung. The suspension means can be operative to engage the roof trim, window channel, top of a window or the like by each having at a free end thereof either ball means or hook means which are operative to prevent the suspension means from slipping free from the secured or engaged position. Each opposite end of the suspension means may be affixed to the telescopic means in a variety of ways, i.e., heat-sealed thereupon or affixed thereinto by ball or clasp securing means which after penetrating the interior diameter of one or more tubes of the telescopic means will not interfere with the operation thereof. This may be accomplished by passing a free end of the suspension means through a bore in the tubular wall at one end of the telescopic means and thereafter knotting same to prevent slippage or to the end of each of said suspension means attaching some type of securing means which effectively lock the suspension means thereinto. The foregoing may also be accomplished by use of some type of cotter pin or butterfly arrangement where each of said suspension means are likewise held within the tubular wall of one or more tubes of the telescopic means and thus prevented from sliding back out. The telescopic means preferably consist of at least two lengths of hollow material having differing diameters so that one is operative to mate and slide within the other. The lateral free ends thereof may be open, caped or crimpted. The hollow material may be either spherical or faceted, i.e., four sides, six sided, etc. As is apparent, it is within the scope of this invention to employ a plurality of pieces to form the telescopic means. In such a case, each succeeding inner tube will have an external diameter of less than the internal diameter of its respective mating outer tube; the latter being an inner tube for the next succeeding tube and so on.

The telescopic means may be made from any suitable material, such as for instance thermosetting resins like alkyd, epoxy, phenolic, polyester, polyurethane, urea or melamine resins or mixtures thereof. Thermoplastic resins may also be used, such as cellulosic, cumarone-indine, polyamides, polyethylene (either low or high density), polypropylene, polystyrene, polyvinyl acetate, polyvinylchloride, other vinyl resins, or mixtures thereof. The telescopic means may likewise be made of any other suitable material such as a paper product, i.e., a cardboard which is sufficiently stiff, resilient and strong so as to absorb impact without itself being crushed. Ideally, the material will be such that while it may be damaged from impact, it will not lose its ability to perform telescopic movement or to continue to function in its desired capacity. Naturally, rubber, styrene-butadiene or acrilonitrile-styrene-butadiene rubber or like synthetic rubbery materials may be used.

As is immediately apparent, the instant invention provides a simple device which will prevent impact damage to the doors and side panels of an automobile and is easily manipulated by the operator. The length and width of the telescopic means may vary depending upon the size of the vehicle to be protected, however, it should be sufficient so as to provide adequate protection, i.e., in its extended position be in the range of about 3 to about 12 feet long and each tube thereof should be at least one-fourth inch in diameter.

The instant device can be employed as follows: When an operator parks his vehicle in an area adjacent another car or where it is expected that another car will be parked adjacent thereto, the operator merely removes from his trunk or any storage facility in the car, the instant telescopic car body guard. At this point, the car body guard is merely a short length of collapsed telescopic material having wound therearound suitable flexible suspension means such as a length of rubber strip, cord or rope-like material or even flexible wire or plastic. The operator attaches to a window channel, roof trim or top of an open window the free end of the suspension means which have the attachment means thereon. When using a window, the latter is thereafter rolled up thereby securely holding the suspension means. The telescopic means may be put in the extended position prior to hanging or thereafter by merely being telescoped outward so as to give sufficient length to cover the portion of the car which is in need of protection. The operator is then free to leave his car without worrying that adjacently parked vehicles will damage the side thereof. Upon returning to the vehicle, the operator merely collapses the telescopic means and removes the free end of each of said suspension means from the position where same has been secured. Alternatively, one may first remove the suspension means from the vehicle and then telescopes inward in a collapsible fashion and thereafter the suspension means may be wrapped about same whereupon the car body guard can then be easily stored.

As is readily apparent, when the car body guard is mounted in position with the telescopic means in the extended position, the doors of adjacent vehicles will be unable to make contact with the area protected thereby. The impact will be absorbed by the guard and thereby one may easily and inexpensively protect his vehicle and piece of mind.

With the above and another objects of the invention in view, the invention consists in the novel construction, arrangement and combination of various elements and parts, as set forth in the description and claims hereof, certain embodiments of same being illustrated in the accompanying drawings and described in the specification.

In the accompanying drawings.

DETAILED DESCRIPTION OF THE INVENTION

Figure 1:
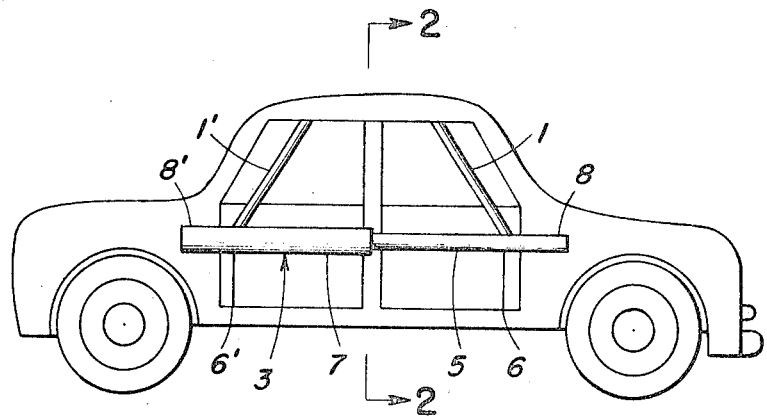
FIG. 1 is a side elevational view of an automobile showing the car body guard mounted with the telescopic means in the extended position.

Referring to FIG. 1, the car body guard includes a set of telescopic means 3 having a certain length. The telescopic means 3 may be constructed from any of the well-known resilient materials, such as the plastics referred to above, the criterion merely being that it be sufficiently resilient so as to function as an impact protector, e.g., polyethylene or polypropylene. FIG. 1, furthermore illustrates the car body guard with the telescopic means 3 in the extended position and suspended from an automobile window 11 by a pair of suspension means 1&1', the telescopic means 3 is shown lying against the side panel or door 2 of the car. The length of the telescopic means 3, when in the extended position is determined by the size of the automobile and/or side portion of the automobile sought to be protected. It is preferable that the telescopic means 3, when extended, substantially cover the length of the surface sought to be protected.

Since the plastic used for the telescopic means 3 is preferably resilient, though preferably not flexible, a stiffening insert need not be used in order to provide rigidity thereto. The telescopic means 3 are preferably comprised of at least two parts, though three or more can be used. There is at least one inner tube 5 and an outer tube or sheath 7 thereover. The inner tube 5 (or tubes) have an internal diameter of less than that of the next successive outer tube 7 so that the outer tube 7 is operative to slide back and forth in opposite directions over the inner tube 5. There is in a preferred embodiment, substantially no free area or clearance between the external surface of the inner tube 5 and the internal inner surface of the outer tube 7. The amount of outward telescoping will be determined by the length of vehicle to be protected and the number of tube portions (5,7) employed. There is also provided securing means 13 which are operative to secure the car body guard via the suspension means 1&1' to a suitable area of the vehicle, i.e., the vehicle window 11 or window channel 15. There may be employed a variety of differing means for this function, i.e., each suspension means 1&1' may have at each free end thereof any suitable connector such as a clip, hook means, cotter pin, ball or similar holding or spreading means which are operative to engage each free end of the suspension means 1&1' to a portion of the vehicle and thereby hold the guard in position. That portion opposite each free end of the suspension means 1&1' is, preferably, permanently secured to the telescopic means 3 in a manner using a similar connector or holding means 4 as aforementioned on each free end of the suspension means 1&1'. A suitable arrangement might be the use of at least two bores 6&6' each suitable to accept therethrough one of the suspension means 1&1', each of said bores 6&6' being located near each exterior or lateral end (8&8') of the inner and outer tubes, 5 and 7, respectively. Connector means 4 are thereafter affixed to each one of the suspension means 1&1' which has passed through the respective bore 6&6' and thus penetrated the internal diameter of its respective tube (5 or 7). The connector means 4 will not interfere with the telescopic movement of the tubes 5 and 7 inasmuch as each will preferably be small and thus the connector means 4 should not make contact with that portion of the outer surface of the inner tube 5 which moves thereunder and thereby within the outer tube 7. Moreover, the bores 6&6' are preferably located near the lateral outer ends 6&6' of each tube (5 and 7) where relatively little telescopic movement occurs.

As is readily apparent, when the outer tube 7 mates with the inner tube 5 during telescopic movement, the connector means 4 will not retard or interfere with this movement. As an alternative, the suspension means 1&1' may also be affixed to the exterior or interior surface of one or both tubes 5 and 7 in a permanent or semi-permanent fashion such as by adhesion with glue or the like, or in some other fashion and thus made an integral part of the respective tube.

Figure 2:
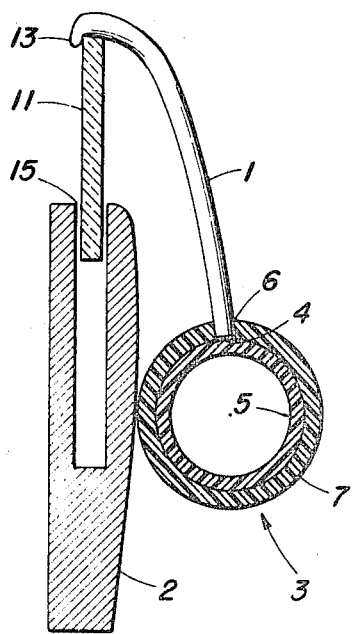
FIG. 2 is a cross-sectional view of the car body guard taken along the line 2—2.

The preferred embodiment of FIG. 2 shows the external surface of the inner tube 5 being substantially in contact with the internal surface of the outer tube 7, for frictional movement, thereby leaving substantially no space between said two surfaces.

The inner tube 5 may be kept from sliding completely out of the outer tube 7 by having at its internal lateral end an enlarged circumference or lip (not shown), the latter being too large to exit from the outer tube 7.

Figure 3:
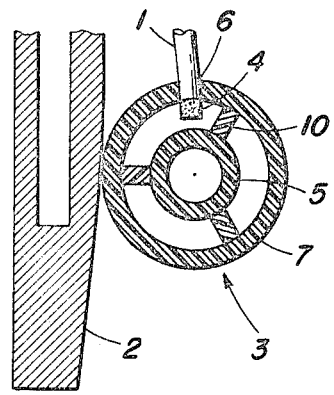
FIG. 3 is similar to FIG. 2 but showing an alternative embodiment.

An alternative embodiment of the invention is shown in part in FIG. 3. The alternative embodiment shows the external surface of the inner tube 5 and the internal surface of the outer tube 7 not being substantially in contact with one another, there being a greater clearance tolerance than shown in FIG. 2. Herein there remains a substantial space between the external surface of the inner tube 5 and the internal surface of the outer tube 7. The inner tube 5 is kept from moving about within the hollow of the outer tube 7 by means of inwardly projecting guiding means 10. The guiding means 10 may be disposed along the inner surface of the outer tube 7, substantially throughout the length thereof and held thereto by suitable known adhesion means. The guiding means 10 are operative to maintain the inner tube 5 in a substantially uniform position with respect to the internal walls of the outer tube 7, by means of a controlling and guiding effect which they collectively exert upon the outer surface of the inner tube 5.

The guiding means 10 may be alternatively attached to the outer surface of the inner tube 5, by means of adhesion, mechanical connectors or any other suitable means. The guiding means 10 may be constructed of any suitable material, such as for example, rubbery like materials, plastic and the like.

I wish it to be understood that I did not desire to be limited to the exact details of construction shown and described for obvious modifications will occur to persons skilled in the art.

Having best described the invention, what I claim as new and desire to be secured by Letters Patent is as follows:

1. A vehicle impact protection device; comprising in combination:
   an outer tube;
   at least one inner tube operative to be moved into and out from said outer tube having inner guiding means thereby forming telescopic means, said outer tube has a predetermined internal diameter and said inner tube has an external diameter of less than the internal diameter of said outer tube where said guiding means centers and spaces said inner tube from said outer tube; suspension means connected to at least one of said tubes; and securing means disposed on said suspension means and being operative to engage a portion of said vehicle.

2. A vehicle impact protection device as defined in claim 1 wherein said suspension means are joined to an external surface of at least one of said tubes.

3. A vehicle impact protection device as defined in claim 1 wherein said suspension means are operative to engage an internal surface of at least one of said tubes.

4. A vehicle impact protection device as defined in claim 1 wherein said suspension means are comprised of at least two members.

5. A vehicle impact protection device as defined in claim 1 wherein said suspension means is formed of flexible material.

6. A vehicle impact protection device as defined in claim 1 wherein said telescopic means is made of resilient material.

7. A vehicle impact protection device as defined in claim 6 wherein said resilient material is plastic.

* * * * *